United States Patent
Ye et al.

(10) Patent No.: US 8,908,393 B2
(45) Date of Patent: Dec. 9, 2014

(54) SOFT TRANSITION APPARATUS AND METHOD FOR SWITCHING POWER CONVERTERS

(75) Inventors: Liming Ye, Frisco, TX (US); Hengchun Mao, Plano, TX (US); Xujun Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 456 days.

(21) Appl. No.: 13/280,225

(22) Filed: Oct. 24, 2011

(65) Prior Publication Data

US 2013/0063982 A1   Mar. 14, 2013

Related U.S. Application Data

(60) Provisional application No. 61/534,790, filed on Sep. 14, 2011.

(51) Int. Cl.
*H02M 3/335* (2006.01)
*H02M 1/36* (2007.01)

(52) U.S. Cl.
CPC ............ *H02M 3/33592* (2013.01); *H02M 1/36* (2013.01); *Y02B 70/1475* (2013.01)
USPC ...................... 363/21.06; 363/21.1

(58) Field of Classification Search
CPC ............................... H02M 1/10; H02M 3/335
USPC .................. 363/20, 21.01, 21.06, 21.1, 21.04
See application file for complete search history.

(56) References Cited

U.S. PATENT DOCUMENTS

| | | | |
|---|---|---|---|
| 6,683,442 B1 * | 1/2004 | Ferencz et al. | 323/274 |
| 6,760,235 B2 | 7/2004 | Lin et al. | |
| 7,885,086 B2 * | 2/2011 | Wang et al. | 363/21.06 |
| 8,670,247 B2 * | 3/2014 | Mase et al. | 363/21.04 |
| 2006/0072349 A1 | 4/2006 | Lin | |
| 2007/0115703 A1 | 5/2007 | Liu et al. | |
| 2009/0080223 A1 | 3/2009 | Wang et al. | |

FOREIGN PATENT DOCUMENTS

| | | |
|---|---|---|
| CN | 1972097 A | 5/2007 |
| CN | 101860187 A | 10/2010 |
| JP | 2010081690 A | 4/2010 |

OTHER PUBLICATIONS

International Search Report and Written Opinion of Patent Cooperation Treaty (PCT), International Application No. PCT/CN2012/081400, Applicant Huawei Technologies Co., Ltd., et al., date of mailing Dec. 20, 2012, 11 pages.

* cited by examiner

*Primary Examiner* — Matthew Nguyen
(74) *Attorney, Agent, or Firm* — Slater & Matsil, L.L.P.

(57) ABSTRACT

An embodiment apparatus comprises a secondary synchronous rectifier and a secondary gate drive controller. The secondary gate drive controller coupled to a transformer winding comprises a secondary synchronous rectifier soft start signal generator configured to generate a plurality of soft start pulses, a pulse width modulation generator configured to generate a forward switch drive signal and a freewheeling switch drive signal based upon a signal across the transformer winding and a soft transition generator configured to generate a soft start freewheeling switch drive signal by gradually releasing the freewheeling switch drive signal during a soft start process.

20 Claims, 9 Drawing Sheets

SOFT TRANSITION APPARATUS AND METHOD FOR SWITCHING POWER CONVERTERS

This application claims the benefit of U.S. Provisional Application No. 61/534,790, filed on Sep. 14, 2011, entitled "Soft Transition Apparatus and Method for Switching Power Converters," which application is hereby incorporated herein by reference.

TECHNICAL FIELD

The present invention relates to an apparatus and method for pulse width modulation (PWM) control, and, in particular embodiments, to a soft transition apparatus and method in switching power converters.

BACKGROUND

A telecommunication network power system usually includes an ac-dc stage converting the power from the ac utility line to a 48V dc distribution bus and a dc/dc stage converting the 48V dc distribution bus to a plurality of voltage levels for all types of telecommunication loads. A conventional ac-dc stage may comprise a variety of EMI filters, a bridge rectifier formed by four diodes, a power factor correction circuit and an isolated dc/dc power converter. The dc/dc stage may comprise a plurality of isolated dc/dc converters. Isolated dc/dc converters can be implemented by using different power topologies, such as LLC resonant converters, flyback converters, forward converters, half bridge converters, full bridge converters and the like.

Active clamp forward converters are widely adopted for small to medium power level isolated power converters in the telecommunications and data communications industries. During a power up of an active clamp forward converter, the secondary side of the active clamp forward converter may operate a diode rectifier mode first when a pre-biased voltage is applied to the output of the active clamp forward converter during the power up. After the output of the active clamp forward converter is more than the pre-biased voltage, the active clamp forward converter may move from diode rectification to synchronous rectification. Such a shift may improve the efficiency of the active clamp forward converter.

SUMMARY OF THE INVENTION

These and other problems are generally solved or circumvented, and technical advantages are generally achieved, by preferred embodiments of the present invention which provide an apparatus and method for a soft transition of a secondary side synchronous rectifier in an isolated power converter.

In accordance with an embodiment, an apparatus comprises a secondary synchronous rectifier coupled to a secondary side of a power converter and a secondary gate drive controller. The secondary synchronous rectifier comprises a forward switch and a freewheeling switch. The secondary gate drive controller is coupled to a transformer winding.

The secondary gate drive controller comprises a secondary synchronous rectifier soft start signal generator configured to generate a plurality of soft start pulses, a pulse width modulation generator configured to generate a forward switch drive signal for the forward switch and a freewheeling switch drive signal for the freewheeling switch based upon a signal across the transformer winding and a soft transition generator configured to generate a soft start freewheeling switch drive signal by gradually releasing the freewheeling switch drive signal during a soft start process.

In accordance with another embodiment, a system comprises a transformer, a secondary synchronous rectifier and a secondary gate drive controller. The transformer has a primary winding coupled to a dc power source through a primary switch and a secondary winding coupled to an output filter. The secondary synchronous rectifier is coupled between the secondary winding and the output filter.

The secondary synchronous rectifier comprises a forward switch and a freewheeling switch. The secondary gate drive controller is coupled to a transformer winding. The secondary gate drive controller comprises a secondary synchronous rectifier soft start signal generator configured to generate a plurality of soft start pulses, a pulse width modulation generator configured to generate a forward switch drive signal for the forward switch and a freewheeling switch drive signal for the freewheeling switch based upon a signal across the transformer winding and a soft transition generator configured to generate a soft start freewheeling switch drive signal by gradually releasing the freewheeling switch drive signal during a soft start process.

In accordance with yet another embodiment, a method comprises detecting a switching pulse from a transforming winding of a power converter, generating a secondary side soft start ramp and generating a plurality of secondary side soft start pulses based upon the secondary side soft start ramp. The method further comprises generating a forward switch gate drive signal, generating a freewheeling switch gate drive signal complementary the forward switch gate drive signal and generating a soft start freewheeling switch gate drive signal by gradually releasing the freewheeling switch gate drive signal.

An advantage of an embodiment of the present invention is gradually releasing the gate drive signal of a freewheeling switch of an isolated power converter so as to ensure the isolated power converter monotonically starts up into a pre-biased output.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a soft transition apparatus and method for a secondary synchronous rectifier of an active clamp forward converter. The invention may also be applied, however, to a variety of isolated dc/dc power converters including half bridge converters, full bridge converters, flyback converters, forward converters, push-pull converters and the like. Furthermore, the invention may also be applied to a variety of non-isolated power converters such as buck switching converters, boost switching converters, buck-boost switching converters and the like.

Figure 1:
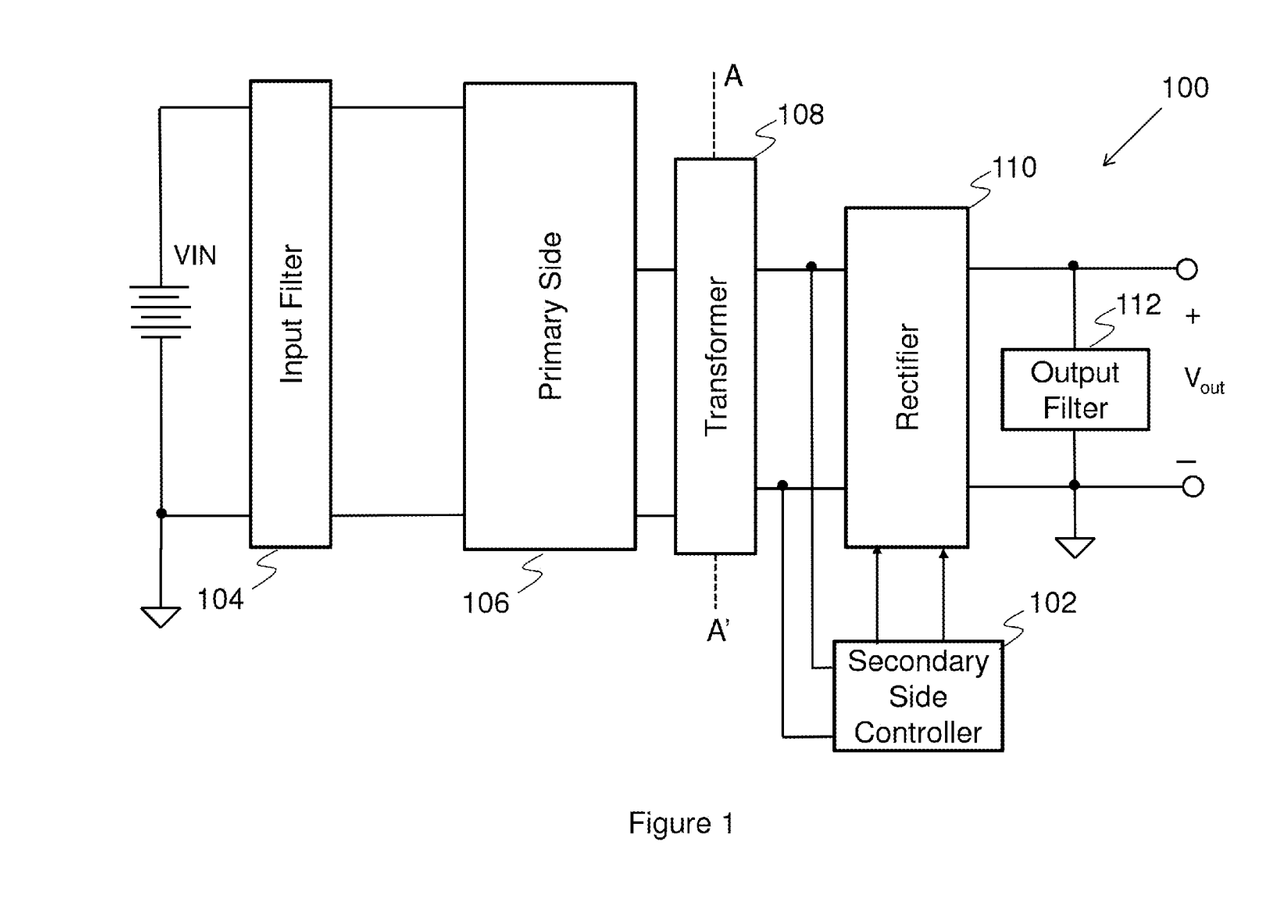
FIG. 1 illustrates a block diagram of an isolated dc/dc converter having a secondary side gate drive controller in accordance with an embodiment.

Referring initially to FIG. 1, a block diagram of an isolated dc/dc converter having a secondary side gate drive controller is illustrated in accordance with an embodiment. The isolated dc/dc converter 100 comprises an input filter 104, a primary side network 106, a transformer 108, a rectifier 110 and an output filter 112. In addition, the secondary side gate drive controller 102 is placed at the secondary side of the isolated dc/dc converter 100. It should be noted that as indicated by a dashed line A-A', the left side of the dashed line including the input dc source VIN, the input filter 104 and the primary side network 106 is commonly referred to as the primary side of the isolated dc/dc converter 100. On the other hand, the right side of the dashed line A-A' including the rectifier 110 and the output filter 112 is commonly referred to as the secondary side of the isolated dc/dc converter 100. Furthermore, as shown in FIG. 1, the transformer 108 is placed between the primary side and the secondary side. In fact, the transformer 108 provides electrical isolation between the primary side and the secondary side of the isolated dc/dc converter 100.

The primary side network 106 is coupled to the input dc source VIN through the input filter 104. Depending on different power converter topologies, the primary side network 106 may comprise different combinations of switches as well as passive components. For example, the primary side network 106 may comprise four switching elements connected in a bridge configuration when the isolated dc/dc converter 100 is a full bridge power converter. On the other hand, when the isolated dc/dc converter 100 is an LLC resonant converter, the primary side network 106 may comprise a high side switching element and a low side switching element connected in series, and a resonant tank formed by an inductor and a capacitor connected in series.

Furthermore, when the isolated dc/dc converter 100 may be an active clamp forward converter, the primary side network 106 may comprise a primary switch and an active clamp reset device formed by an auxiliary switch and a clamp capacitor. The detailed operation of active clamp forward converters will be discussed below with respect to FIG. 2. One of ordinary of skill in the art will realize that the isolated dc/dc converter 100 as well as its corresponding primary side network 106 may be implemented in many different ways. It should be noted that the power converter topologies discussed herein are provided for illustrative purposes only, and are provided only as examples of various embodiments.

The input filter 104 may comprise an inductor coupled between the input dc source VIN and the primary side network 106. The input filter 104 may further comprise a plurality of input capacitors. The inductor provides high impedance when switching noise tries to flow out of the primary side network 106. At the same time, the input capacitors shunt the input of the isolated dc/dc converter 100 and provide a low impedance channel for the switching noise generated from the primary side network 106. As a result, the switching noise of the isolated dc/dc converter 100 may be prevented from passing through the input filter 104. The structure and operation of the input filter of an isolated dc/dc converter are well known in the art, and hence are not discussed in further detail.

The transformer 108 provides electrical isolation between the primary side and the secondary side of the isolated dc/dc converter 100. In accordance with an embodiment, the transformer 108 may be formed of two transformer windings, namely a primary transformer winding and a secondary transformer winding. Alternatively, the transformer 108 may have a center tapped secondary so as to have three transformer windings including a primary transformer winding, a first secondary transformer winding and a second secondary transformer winding. It should be noted that the transformers illustrated herein and throughout the description are merely examples, which should not unduly limit the scope of the claims. One of ordinary skill in the art would recognize many variations, alternatives, and modifications. For example, the transformer 108 may further comprise a variety of bias windings and gate drive auxiliary windings.

The rectifier 110 converts an alternating polarity waveform received from the output of the transformer 108 to a single polarity waveform. The rectifier 110 may be formed of a pair of switching elements such as NMOS transistors. Alternatively, the rectifier 110 may be formed of a pair of diodes. Furthermore, the rectifier 110 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices and the like. The detailed operation and structure of the rectifier 110 are well known in the art, and hence are not discussed herein.

The output filter 112 is used to attenuate the switching ripple of the isolated dc/dc converter 100. According to the operation principles of isolated dc/dc converters, the output filter 112 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 112 are within various embodiments of the present disclosure.

FIG. 1 further illustrates a secondary side gate drive controller 102 coupled to the secondary side of the isolated dc/dc converter 100. More particularly, the secondary side gate drive controller 102 has two terminals coupled a transformer winding of the secondary side of the transformer 108. In addition, the secondary side gate drive controller 102 has the other two terminals coupled to the secondary side rectifier 110 respectively. In accordance with an embodiment, when the secondary side rectifier 110 is a synchronous rectifier formed by two controllable switches, the secondary side gate drive controller 102 may generate two gate drive signals for the two controllable switches respectively.

Furthermore, the secondary side gate drive controller 102 is capable of generating two complementary gate drive signals for the secondary side rectifier 110 when the isolated dc/dc power converter 100 operates in a normal mode. Moreover, when the isolated dc/dc power converter 100 operates in a soft start mode, the secondary side gate drive controller 102 is capable of gradually releasing the gate drive signal of a freewheeling switch of the secondary synchronous rectifier 110 so as to ensure that the isolated dc/dc power converter monotonically starts up into a pre-biased output. The detailed operation of the secondary side gate drive controller 102 will be described below with respect to FIGS. 3-9.

Figure 2:
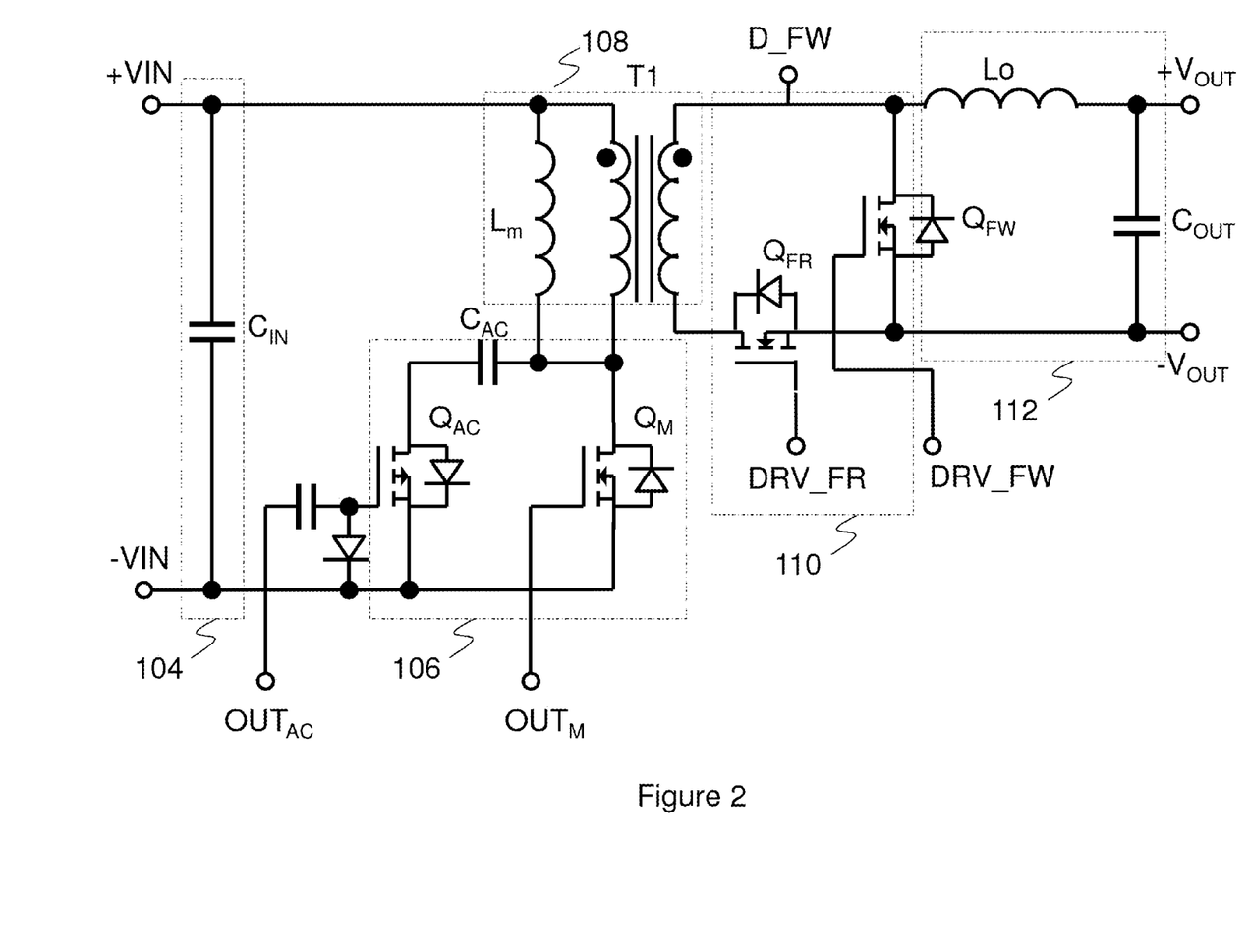
FIG. 2 illustrates a schematic diagram of an active clamp forward converter in accordance with an embodiment.

FIG. 2 illustrates a schematic diagram of an active clamp forward converter in accordance with an embodiment. An input voltage source VIN is coupled to a primary switch $Q_M$ through the primary winding of the transformer 108. For simplicity, throughout the description, the transformer 108 is alternatively referred to as transformer T1. The primary switch $Q_M$ is connected in parallel with an active clamp reset device formed by an auxiliary switch $Q_{AC}$ and a clamp capacitor $C_{AC}$ connected in series. In accordance with an embodiment, the primary switch $Q_M$ is an n-type MOSFET device. The auxiliary switch $Q_{AC}$ is a p-type MOSFET device. The clamp capacitor $C_{AC}$ is a 0.1 $u^F$ ceramic capacitor.

A primary pulse width modulation (PWM) controller (not shown) may generate two gate drive signals $OUT_M$ and $OUT_{AC}$ for the primary switch $Q_M$ and the auxiliary switch $Q_{AC}$ respectively. According to the operating principles of an active clamp forward converter, the amount of time D·T that the primary switch $Q_M$ conducts current during a switching period T is determined by a duty cycle D. The duty cycle D may have a value from 0 to 1. On the other hand, the amount of time that the auxiliary switch $Q_{AC}$ conducts current is approximately equal to (1−D)·T.

In accordance with an embodiment, the secondary rectifier 110 is formed by a forward switch $Q_{FR}$ and a freewheeling switch $Q_{FW}$. Both the forward switch $Q_{FR}$ and the freewheeling switch $Q_{FW}$ may be an n-type MOSFET device. It should be noted that the synchronous rectifier may be formed by other switching elements such as BJT devices, SJT devices, IGBT devices and the like. It should further be noted that while FIG. 2 illustrates a single switching element for either the forward switch $Q_{FR}$ or the freewheeling switch $Q_{FW}$, one of ordinary skill in the art would recognize many variations, alternatives, and modifications. For example, the forward switch $Q_{FR}$ may comprise a plurality of MOSFET devices connected in parallel.

As shown in FIG. 2, both the sources of the forward switch $Q_{FR}$ and the freewheeling switch $Q_{FW}$ are coupled together and further coupled to the negative terminal of the secondary output. The forward switch $Q_{FR}$ and the freewheeling switch $Q_{FW}$ are driven by gate drive signals DRV_FR and DRV_FW respectively, which are generated by a secondary side gate drive controller (not shown but illustrated in FIG. 3). The detailed operation of the secondary side gate driver will be discussed below with respect to FIGS. 3-6.

According to the operation principles of an active clamp forward converter, when the input voltage source VIN is applied to the primary side winding of the transformer T1 through the turn-on of the primary switch $Q_M$, the polarity of the secondary side winding of the transformer T1 is so configured that the secondary side positive output is coupled to the secondary side of the transformer T1 through the output inductor Lo and the turned-on forward switch $Q_{FR}$. On the other hand, when the primary side switch $Q_M$ is turned off, the secondary output is maintained by a freewheeling current path formed by the output inductor Lo and the turned on freewheeling switch $Q_{FW}$.

It should be noted that both the forward switch $Q_{FR}$ and the freewheeling switch $Q_{FW}$ may comprise a body diode as shown in FIG. 2. The body diode may conduct current in some periods such as the dead time period between the turn-on periods of two switches. In addition, during a power up process, the secondary side gate drive controller may turn off both switches. As a result, the active clamp forward converter may operate in a diode rectification mode. In sum, the turn-on periods of the forward switch $Q_{FR}$ and the freewheeling switch $Q_{FW}$ are mutually exclusive. There may be a dead time period between the turn-on periods of two switches. Both body diodes may conduct during the dead time period.

Figure 3:
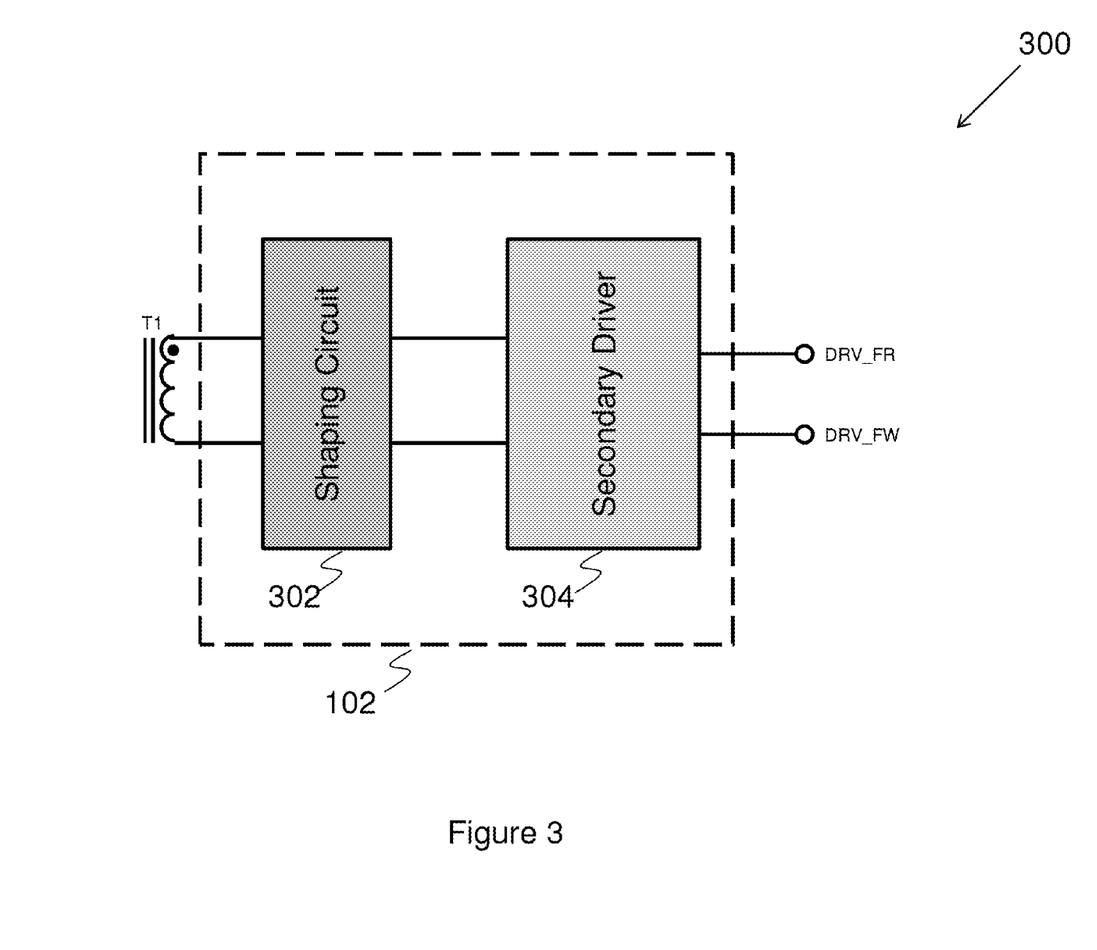
FIG. 3 illustrates a block diagram of the secondary side gate drive controller in accordance with an embodiment.

FIG. 3 illustrates a block diagram of the secondary side gate drive controller in accordance with an embodiment. The secondary side gate drive controller 102 may comprise a signal shaping circuit 302 and a secondary side gate driver 304. The signal shaping circuit 302 is coupled to a secondary winding of the transformer T1. One skilled in the art will recognize that the winding shown in FIG. 3 is an auxiliary winding coupled to the transformer T1. Alternatively, the winding shown in FIG. 3 may be a secondary power winding of the transformer T1.

The signal shaping circuit 302 is used to eliminate the noise contamination of the switching signal detected from the winding shown in FIG. 3. The detailed schematic diagram of the signal shaping circuit 302 will be discussed in detail with respect to FIG. 4. The secondary side gate driver 304 receives the signals from the signal shaping circuit 302 and further generates a pair of gate drive signals, namely DRV_FR and DRV_FW for the secondary synchronous rectifier 110 (not shown but illustrated in FIG. 2). The secondary side gate driver 304 is capable of gradually releasing the gate drive signal of DRV_FW during a soft start process of the isolated dc/dc power converter (illustrated in FIG. 2). In addition, the secondary side gate driver 304 is capable of fully turning off the forward switch and the freewheeling switch when the secondary side gate driver 304 detects a shutdown through the signal from the shaping circuit 302. The detailed operation of secondary side gate driver 304 will be discussed in FIGS. 4-7.

Figure 4:
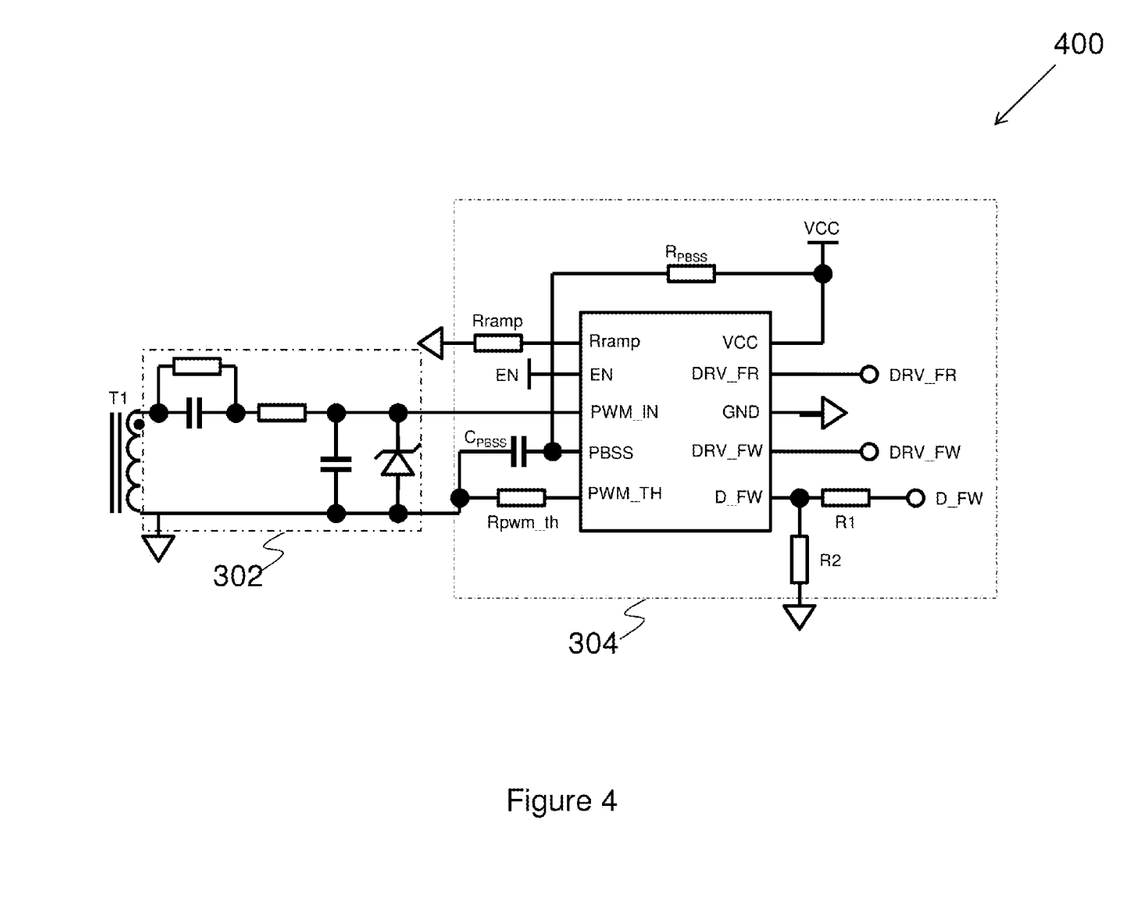
FIG. 4 illustrates a schematic diagram of a secondary side gate drive controller in accordance with an embodiment.

FIG. 4 illustrates a schematic diagram of a secondary side gate driver in accordance with an embodiment. As shown in FIG. 4, the secondary side gate driver 304 may have ten input and output terminals. It should be noted that the secondary side gate driver 304 is capable of generating the gate drive signals, DRV_FR and DRV_FW without relying on the primary PWM signal generated by the primary side PWM controller (not shown). In particular, it is not necessary to employ an isolation device such as a signal transformer to transfer the primary side PWM signal across the isolation boundary.

Instead, the secondary side gate driver 304 receives PWM_IN signal from the transformer winding shown in FIG. 4 through the signal shaping circuit 302. Based upon the PWM_IN signal and several adjustable parameters such as PBSS, Rramp and PWM_TH, the secondary side gate driver 304 is capable of generating two complementary gate drive signals DRV_FR and DRV_FW for the forward switch $Q_{FR}$ and the freewheeling switch $Q_{FW}$ respectively. Furthermore, during a power up process, the secondary side gate driver 304 is able to gradually release the width of the freewheeling gate drive signal DRV_FW so as to achieve a monotonic startup.

Figure 5:
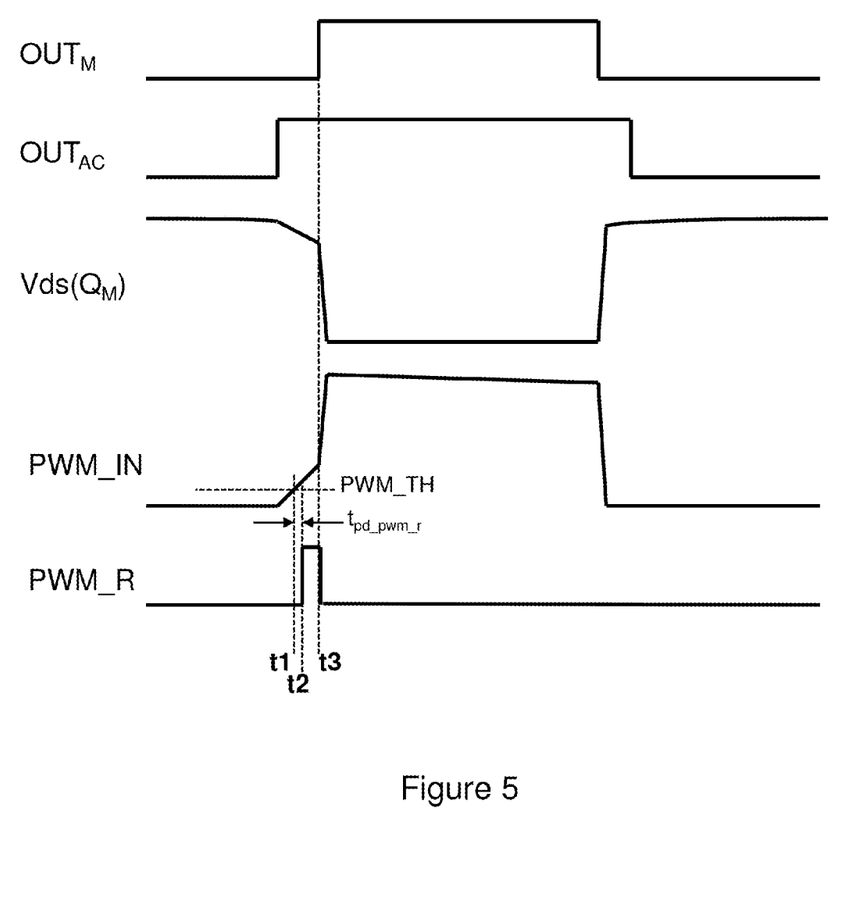
FIG. 5 illustrates an embodiment timing diagram of generating PWM_R in accordance with an embodiment.

FIG. 5 illustrates an embodiment timing diagram of generating PWM_R in accordance with an embodiment. PWM_R is generated by the secondary side gate drive controller 102 (shown in FIG. 4) and used to indicate whether the primary side switch $Q_M$ is activated. More particularly, when the primary side switch $Q_M$ is enabled, a square waveform is applied to the primary side of the transformer T1. In response to the square waveform on the primary side of the transformer T1, there may be a square waveform on the secondary side of the transformer T1 as well as the auxiliary winding of the transformer T1. When the secondary side waveform such as PWM_IN is more than a predetermined value, PWM_R is asserted.

FIG. 5 illustrates an embodiment timing diagram of generating PWM_R. $OUT_M$ is the gate drive signal of the primary switch $Q_M$. $OUT_{AC}$ is the gate drive signal of the auxiliary switch $Q_{AC}$. $Vds(Q_M)$ is the voltage across the drain and the source of the primary switch $Q_M$. As shown in FIG. 5, at time t1, the secondary side waveform PWM_IN reaches a predetermined value PWM_TH. As a consequence, at time t2, the secondary side gate drive controller 102 (not shown) changes the logic status of PWM_R from a logic low state to a logic high state after a fixed delay tpd_PWM_r. At time t3, the secondary side gate drive controller resets the logic state of PWM_R. An advantageous feature of having PWM_R is that the secondary side gate drive controller 102 can detect whether the primary side switching network operates in a normal mode or in a shutdown mode without relying on a signal transformer transferring the primary side PWM signal across the isolation boundary shown in FIG. 1. It should be noted that the width of each PWM_R pulse is fixed. In accordance with an embodiment, the width of PWM_R pulses is about 50 ns.

Figure 6:
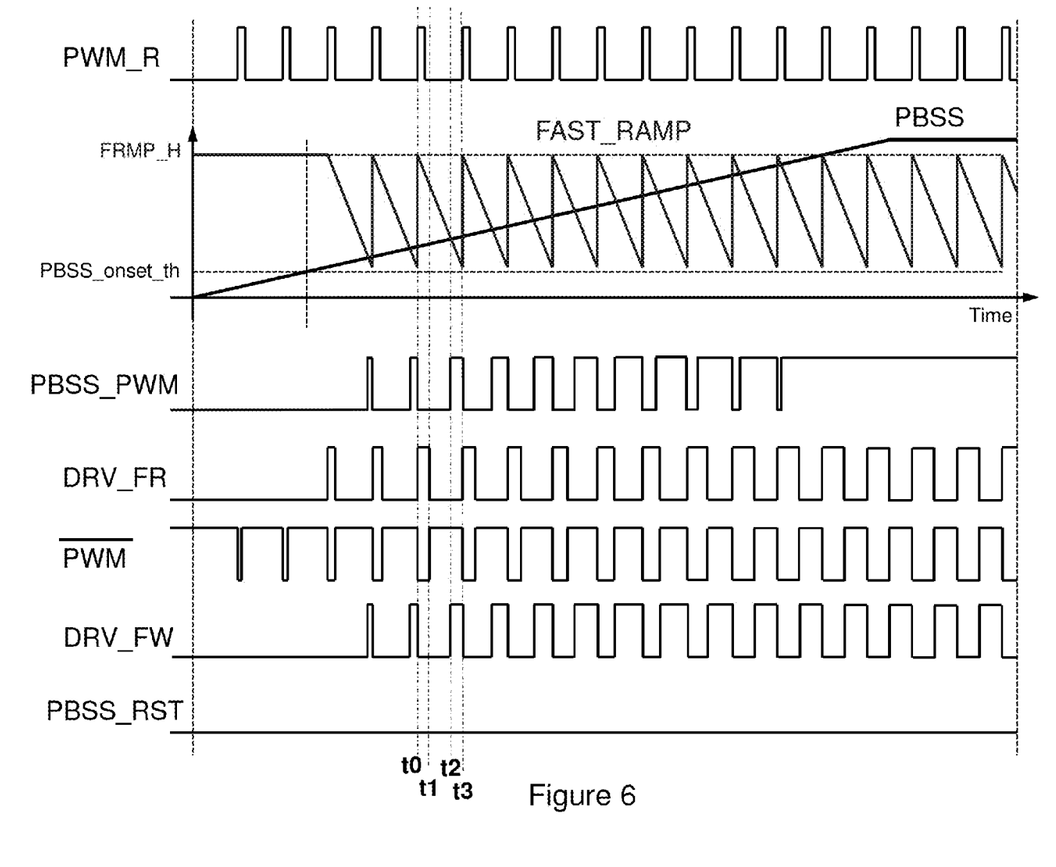
FIG. 6 illustrates an embodiment timing diagram of signals in an isolated power converter operating in a power up mode in accordance with an embodiment.

FIG. 6 illustrates an embodiment timing diagram of signals in an isolated power converter operating in a power up mode in accordance with an embodiment. As described above with respect to FIG. 5, PWM_R is a signal indicating the operating status of the primary side switching network. In particular, PWM_R is an indicator illustrating whether the power converter enters a shutdown mode. As shown in FIG. 6, PWM_R has the same switching frequency as that of the primary switch of the active clamp forward converter (shown in FIG. 2). FAST_RAMP is a ramp signal generated by the secondary side gate driver 304 (shown in FIG. 4). As shown in FIG. 6, FAST_RAMP has a switching frequency approximately equal to the switching frequency of the active clamp forward converter. The function of a ramp signal in a PWM controller is well known in the art, and hence is not discussed in further detail herein. PBSS is a soft start signal for the secondary side synchronous rectifier. In accordance with an embodiment, PBSS can be implemented by charging a capacitor from a fixed current source (e.g., 10 uA) up to a predetermined value. By adjusting the value of the soft start capacitor (e.g., $C_{PBSS}$ shown in FIG. 4), various soft start periods can be achieved depending on different applications. PBSS_PWM is the result of comparing the FAST_RAMP signal and the PBSS signal. In particular, the PBSS_PWM is asserted when the PBSS signal is greater than the FAST_RAMP signal. As shown in FIG. 6, the pulse width of the PBSS_PWM gradually increases during the soft start period of the secondary side synchronous rectifier. In particular, at the beginning of a startup, there may be no pulses at PBSS_PWM. As PBSS increases, shorter pulses occur at PBSS_PWM as a result. Furthermore, the width of PBSS_PWM pulses increases in proportion to the amplitude of PBSS. Eventually, when PBSS is more than the peak of FAST_RAMP, the soft transition of the secondary side synchronous rectifier is over. As a consequence, PBSS_PWM has a constant dc voltage.

DRV_FR is the drive signal for the forward switch $Q_{FR}$ (shown in FIG. 2) of the synchronous rectifier. According to the operating principles of an active clamp forward converter, DRV_FR is approximately identical to the drive signal of the primary side switch $Q_M$. As such, during the soft start process, the DRV_FR signal gradually increases its width from a small duty cycle to its steady state duty cycle. DRV_FW should be complementary to DRV_FR according to the definition of a synchronous rectifier. However, in order to reduce the reverse current as well as the voltage drop at the pre-biased output voltage, DRV_FW may be gradually released during the soft start of the secondary side synchronous rectifier.

For example, during a switching period (e.g., the interval t0 to t3), the turn-on period of DRV_FR is the interval t0 to t1. Ideally, DRV_FW should be complementary to DRV_FR as indicated by $\overline{PWM}$. Instead of having a turn-on period between the interval t1 to t3, DRV_FW is limited by the PBSS_PWM. As shown in FIG. 6, DRV_FW is the product of PBSS_PWM and $\overline{PWM}$. As a result, the turn-on period of DRV_FW is limited to the interval t2 to t3. A gradually released DRV_FW shown in FIG. 6 helps to slowly move the secondary side from diode rectification to synchronous rectification. As a consequence, the gradually released DRV_FW helps to prevent the turned on freewheeling switch $Q_{FW}$ (shown in FIG. 2) from discharging the pre-biased output voltage. As a result, the output voltage can achieve a monotonic startup.

Figure 7:
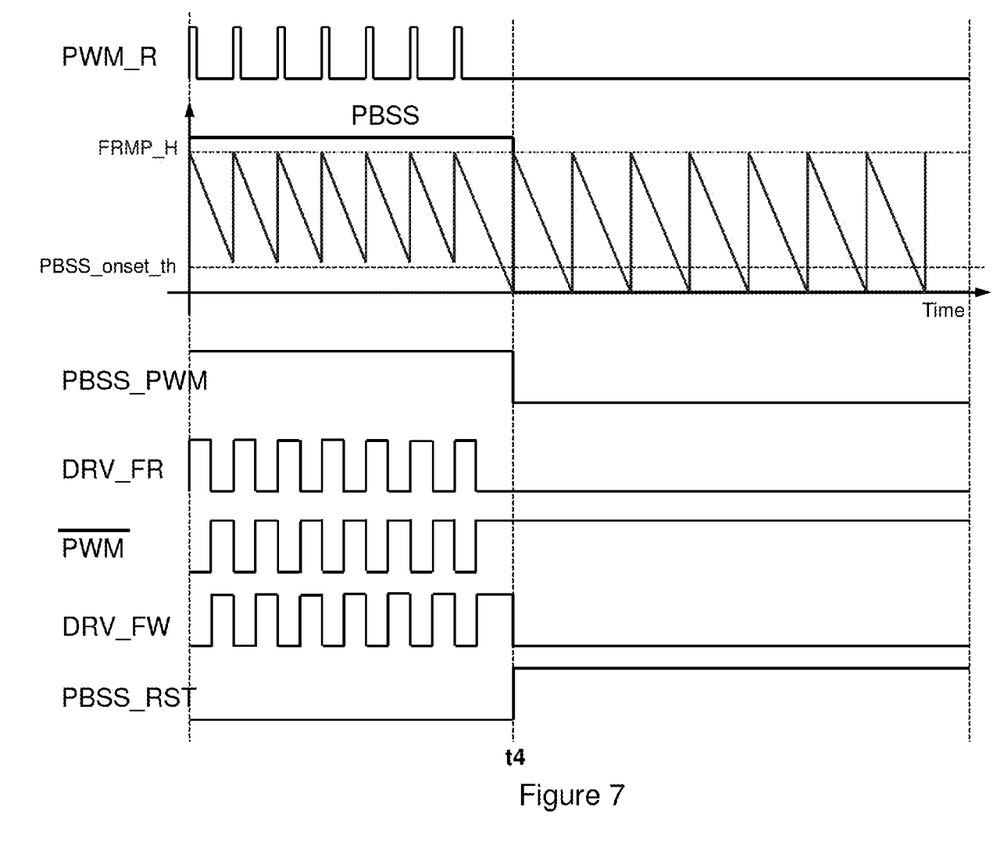
FIG. 7 illustrates an embodiment timing diagram of signals in an isolated power converter operating in a shutdown mode in accordance with an embodiment.

FIG. 7 illustrates an embodiment timing diagram of signals in an isolated power converter operating in a shutdown mode in accordance with an embodiment. As described above with respect to FIG. 5, PWM_R is an indicator of the primary side switching network. More particularly, PWM_R may stop generating pulses when the primary side stops switching. As shown in FIG. 7, the secondary side gate driver 304 stops generating PWM_R pulses at time t4 when the primary side switch $Q_M$ stops switching. Due to the absence of the PWM_R pulse at interval 4, the FAST_RAMP signal cannot be reset and keep discharging until the FAST_RAMP signal is less than a predetermined threshold such as PBSS_onset_th. It should be noted a variety of thresholds (e.g., 0V) can be used to detect the falling of the FAST_RAMP signal. As shown in FIG. 7, after the FAST_RAMP is less than the threshold, PBSS is reset to a logic low state and PBSS_RST is set to a logic high state. In response to the logic state changes at PBSS_PWM and PBSS_RST, both DRV_FR and DRV_FW are set to a logic low state. Such a logic low state turns off the secondary synchronous rectifier so as to prevent self-oscillation of the synchronous rectifier.

Figure 8:
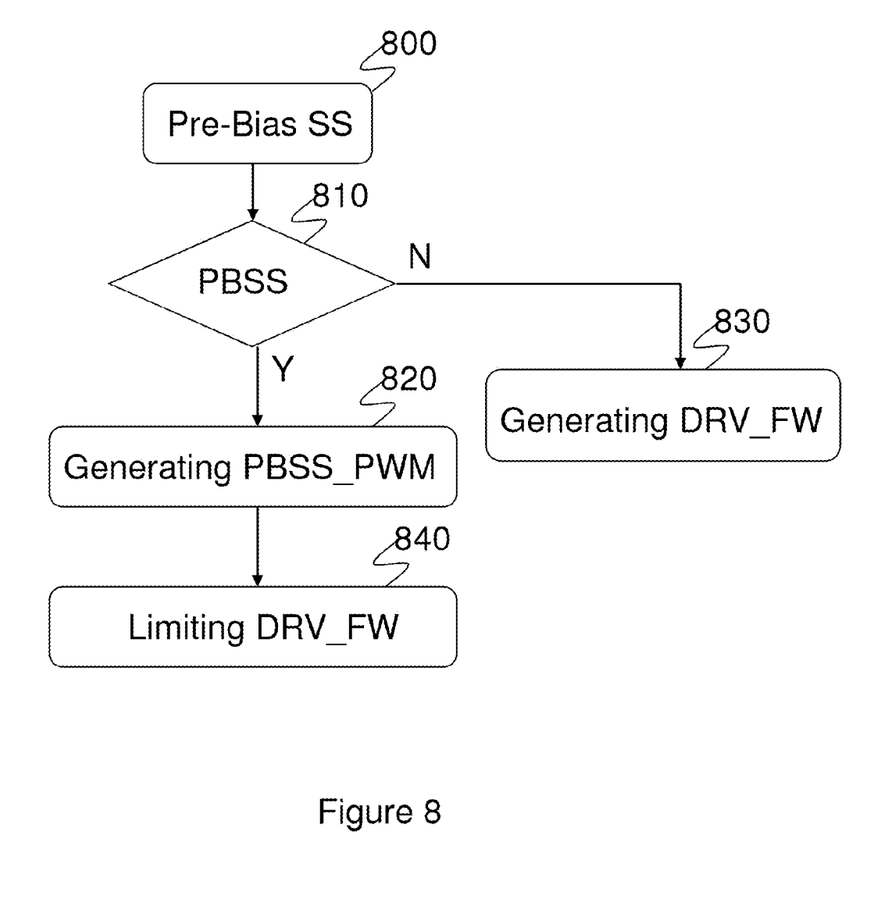
FIG. 8 illustrates a flow chart of a synchronous rectifier soft transition scheme in accordance with an embodiment.

FIG. 8 illustrates a flow chart of a synchronous rectifier soft transition scheme in accordance with an embodiment. At step 800, a switching power supply employing the soft transition scheme described with respect to FIG. 6 may be started up into a pre-biased output voltage. At step 810, if the switching power supply is still under a soft start process of the secondary synchronous rectifier, then the algorithm executes step 820 wherein the algorithm starts generating PBSS_PWM and further uses the PBSS_PWM to limit the pulse width of the freewheeling switch of the synchronous rectifier. On the other hand, if PBSS ramps up to its steady state value, the soft transition of the synchronous rectifier is over. As a result, the algorithm executes step 830 wherein the algorithm generates the PWM signal of the freewheeling switch directly without the limitation from PBSS_PWM. In other words, at step 830, the PWM signal applied to the freewheeling switch is complementary to the PWM signal applied to the forward switch.

Figure 9:
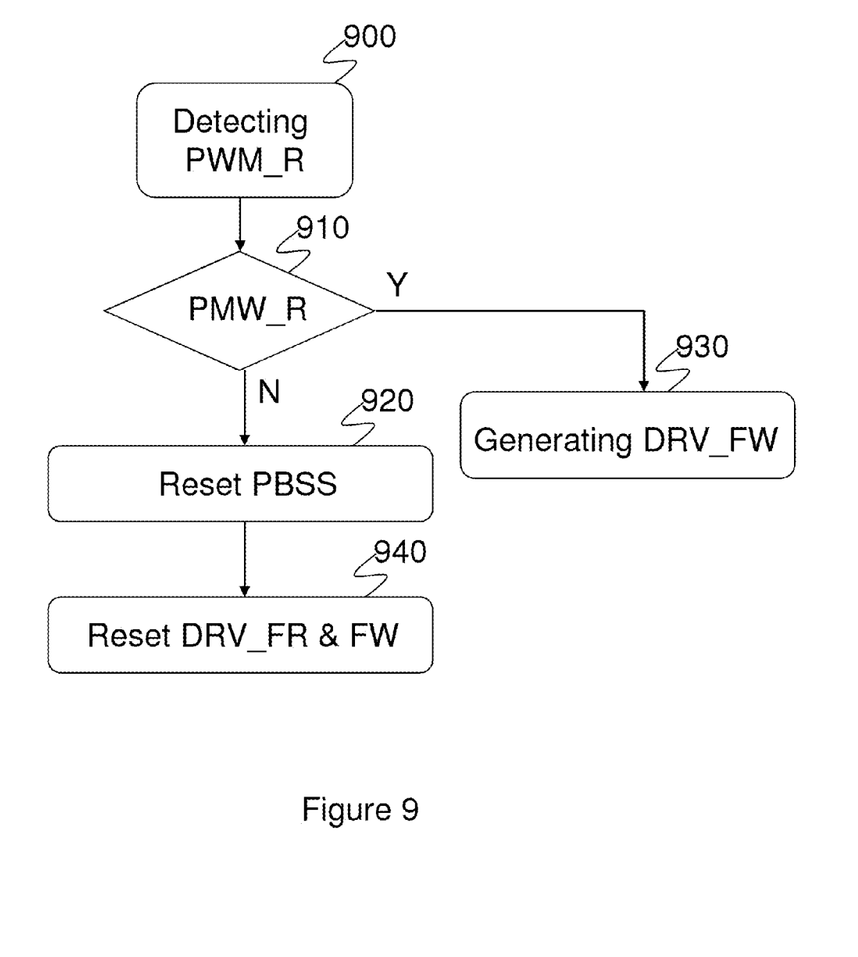
FIG. 9 illustrates a flow chart of a synchronous rectifier shutdown scheme in accordance with an embodiment.

FIG. 9 illustrates a flow chart of a synchronous rectifier shutdown scheme in accordance with an embodiment. At step 900, a switching power supply employing the shutdown scheme described with respect to FIG. 7 keeps detecting the status of PWM_R. At step 910, if PWM_R signal is not asserted during a switching cycle, then the algorithm executes step 920 wherein the algorithm starts resetting PBSS and further turns off both the gate drive signals of DRV_FR and DRV_FW. On the other hand, if the switching power supply can detect a valid PWM_R pulse, the switching power supply remains operating in a normal mode. As a result, the algorithm executes step 930 wherein the algorithm generates the PWM signals for both the freewheeling switch and forward switch.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   a secondary synchronous rectifier coupled to a secondary side of a power converter comprising a forward switch and a freewheeling switch; and
   a secondary gate drive controller coupled to a transformer winding of the power converter comprising
      a secondary synchronous rectifier soft start signal generator configured to generate a plurality of soft start pulses;
      a pulse width modulation generator configured to generate a forward switch drive signal for the forward switch and a freewheeling switch drive signal for the freewheeling switching based upon a signal across the transformer winding; and
      a soft transition generator configured to generate a soft start freewheeling switch drive signal by gradually releasing the freewheeling switch drive signal during a soft start process.

2. The apparatus of claim 1, wherein the soft transition generator generates the soft start freewheeling switch drive signal based upon a product of one of the soft start pulses and a corresponding freewheeling switch drive signal.

3. The apparatus of claim 1, wherein the transformer winding is a power transformer winding coupled to the forward switch and the freewheeling switch.

4. The apparatus of claim 1, wherein the transformer winding is an auxiliary transformer winding magnetically coupled to a transformer of the power converter.

5. The apparatus of claim 1, further comprising a signal shaping circuit coupled between the transformer winding and the secondary gate drive controller.

6. The apparatus of claim 1, wherein the secondary gate drive controller is configured to:
   detect a predetermined condition representing a shutdown;
   reset the secondary synchronous rectifier soft start signal generator; and
   turn off the forward switch and the freewheeling switch to reduce self-oscillation of secondary side circuits.

7. The apparatus of claim 1, wherein the secondary gate drive controller is configured such that the power converter monotonically starts up into a pre-biased output.

8. A system comprising:
   a transformer of a power converter having a primary winding coupled to a dc power source through a primary switch and a secondary winding coupled to an output filter;
   a secondary synchronous rectifier coupled between the secondary winding and the output filter comprising a forward switch and a freewheeling switch; and
   a secondary gate drive controller coupled to a transformer winding comprising
      a secondary synchronous rectifier soft start signal generator configured to generate a plurality of soft start pulses;
      a pulse width modulation generator configured to generate a forward switch drive signal for the forward switch and a freewheeling switch drive signal for the freewheeling switch based upon a signal across the transformer winding; and
      a soft transition generator configured to generate a soft start freewheeling switch drive signal by gradually releasing the freewheeling switch drive signal during a soft start process.

9. The system of claim 8, wherein the power converter is selected from the group consisting of a forward converter, a flyback converter, a half bridge converter, a full bridge converter and a push-pull converter.

10. The system of claim 8, wherein the power converter monotonically starts up into a pre-biased output by gradually releasing the freewheeling switch drive signal during a soft start process.

11. The system of claim 8, further comprising an active reset device connected in parallel with the primary switch, wherein the active reset device comprises:
   an auxiliary switch; and
   a reset capacitor connected in series with the auxiliary switch.

12. The system of claim 11, further comprising a primary side controller configured to:
   generate a primary switch gate drive signal; and
   generate an auxiliary switch gate drive signal, wherein the auxiliary switch gate drive signal is approximately complementary to the primary switch gate drive signal.

13. The system of claim 8, wherein the power converter comprises:
   a first soft start process wherein an output of the power converter gradually increases to a predetermined level; and a second soft start process wherein the freewheeling switch drive signal is gradually released until the output of the power converter reaches the predetermined level.

14. The system of claim 13, wherein the second soft start process is adjustable by using a resistor coupled to the secondary gate drive controller.

15. A method comprising:
    detecting a switching pulse from a transforming winding of a power converter;
    generating a secondary side soft start ramp;
    generating a plurality of secondary side soft start pulses based upon the secondary side soft start ramp;
    generating a forward switch gate drive signal;
    generating a freewheeling switch gate drive signal complementary to the forward switch gate drive signal; and
    generating a soft start freewheeling switch gate drive signal by gradually releasing the freewheeling switch gate drive signal.

16. The method of claim 15, further comprising:
    generating the soft start freewheeling switch drive signal based upon a product of a soft start pulse and a corresponding freewheeling switch drive signal.

17. The method of claim 15, further comprising:
    detecting a predetermined condition representing a shutdown;
    resetting a secondary soft start ramp; and
    turning off the forward switch and the freewheeling switch to reduce self-oscillation of secondary side circuits.

18. The method of claim 15, further comprising:
    detecting the switching pulse from a transforming power winding coupled to the forward switch and the freewheeling switch.

19. The method of claim 15, further comprising:
    detecting the switching pulse from a transforming auxiliary winding magnetically coupled to a transformer of the power converter.

20. The method of claim 15, further comprising:
    configuring a secondary side gate drive controller such that the power converter monotonically starts up into a pre-biased output.

* * * * *